April 28, 1942. R. L. SMIRL 2,281,118
ROTOR BRAKE
Filed Nov. 22, 1940
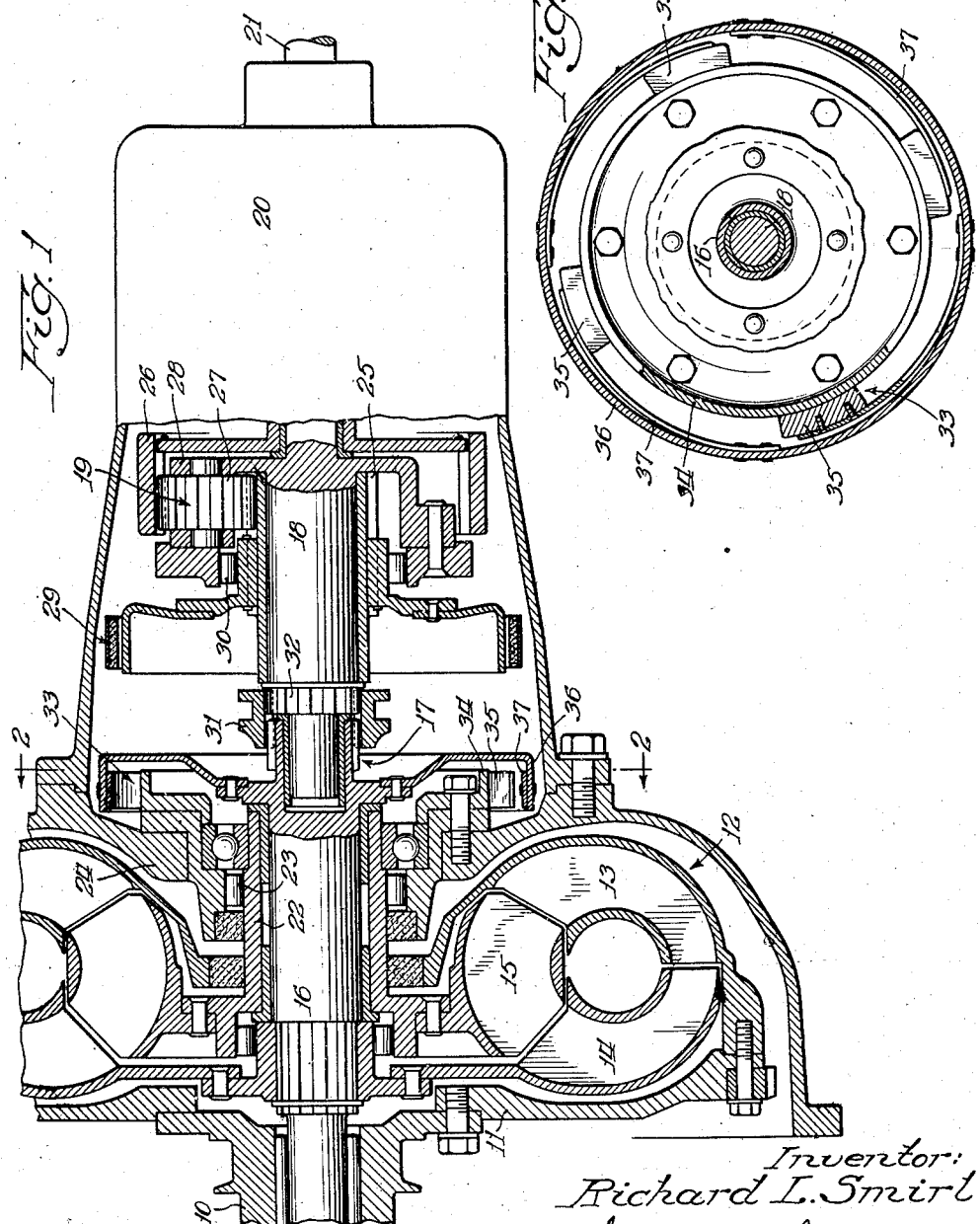
Inventor:
Richard L. Smirl
By: Edward C. Gritzbaugh
Atty.

Patented Apr. 28, 1942

2,281,118

UNITED STATES PATENT OFFICE 2,281,118

ROTOR BRAKE

Richard L. Smirl, Bellwood, Ill., assignor to Borg-Warner Corporation, Chicago, Ill., a corporation of Illinois Application November 22, 1940, Serial No. 366,547

7 Claims. (Cl. 192—12)

This invention relates to power transmitting devices and particularly to such devices wherein the torque transmitted is a function of the speed of the driving element thereof. Typical of such devices are hydro-dynamic devices such as hydraulic torque converters and couplings.

It has been proposed to use hydraulic torque converters and couplings in automobile transmissions and particularly in combination with gearing to provide a transmission which may be substituted for the standard manually operated friction clutch and gear shift transmission commonly used in automobiles. In one form the proposed transmission comprises a hydraulic torque converter combined with gearing in such a manner as to require the use of a jaw clutch, either to facilitate shifting or to provide a definite neutral position. Such a transmission, however, is not entirely satisfactory because the hydraulic torque converter at idling speeds of the engine transmits sufficient torque to impose a load upon all the elements of the gearing and to cause the car to creep. With the elements of the gearing loaded, it is difficult, if not impossible, to engage or disengage a positive clutch without the use of excessive and harmful force.

The object of this invention is to provide automatic means for preventing the transmission of torque from a hydraulic drive mechanism to gearing associated with the mechanism while the drive mechanism is rotating at low speeds corresponding to idling speeds of an automobile engine.

The preferred embodiment of the invention is shown in the accompanying drawing in which:

Fig. 1 is a side elevation, partly in section of a transmission embodying this invention; and Fig. 2 is an elevation in section of the transmission taken along the line 2—2 of Fig. 1.

Referring now to the drawing for a detailed description of the invention, 10 is the drive shaft of an engine to which is bolted a flywheel 11. Said flywheel 11 constitutes a portion of a torque converter 12 having a vaned pump member 13, a vaned turbine or driven member 14 and an intermediate reaction member 15 which is vaned to return the fluid from the turbine member 14 to the pump member 13. Turbine member 14 is splined upon an intermediate shaft 16 which is connected by a jaw clutch 17 to a second shaft 18 constituting the drive element of a change speed gear 19. Said change speed gear drives in turn a reversing mechanism 20, the details of which form no part of this invention and accordingly are omitted. The drive is then transmitted from the reversing mechanism 20 to driven shaft 21.

Reaction member 15 is mounted upon a sleeve 22 which may be held against rotation by a roller-and-cam type one-way brake 23 reacting against bell housing 24.

The change speed gearing 19 comprises in the form illustrated, a sun gear 25, a ring gear 26, planet gears 27 meshing with sun gear 25 and ring gear 26, and a carrier 28 for planet gears 27, said carrier being mounted to rotate with shaft 18. A brake 29 is provided for sun gear 25 and a one-way clutch 30 prevents the sun gear from rotating faster than the carrier. Ring gear 26 constitutes the out-put member of the change speed gearing. When brake 29 is applied to sun gear 25, ring gear 26 is driven at an over-speed with respect to shaft 18, and when brake 29 is released, the reaction of the load on ring gear 26 will tend to cause sun gear 25 to rotate ahead of carrier 28 thereby causing one-way clutch 30 to come into play and lock the carrier to the sun gear. This latter condition results in a one-to-one, or direct, drive through the change speed gearing.

When it is desired to disconnect change speed gearing 19 completely from the engine, a jaw clutch 17, which is comprised of a slidable, internally toothed collar 31 cooperating with teeth 32 on the forward end of shaft 18, is operated (Fig. 1) to uncouple collar 31 from teeth 32 of shaft 18. To reestablish the drive through the transmission, clutch 17 is operated in a manner to couple teeth 32 with the teeth in collar 31 to lock shaft 18 to shaft 16.

It is a characteristic of hydraulic torque converters that at idling speeds of an engine associated therewith, a small amount of torque, commonly referred to as "drag" torque, is still transmitted through the converter. When this drag torque is imposed upon jaw clutch 17 a reestablishment of the drive through the clutch to the gearing becomes next to impossible. To obviate this difficulty, an automatic brake 33 is provided for intermediate shaft 16 which prevents the transmission of torque to the jaw clutch at idling speeds of the engine.

Referring now to Fig. 2, automatic brake 33 is comprised of a drum 34 which is rigid with bell housing 24, and a plurality of brake shoes 35 which are mounted on a flange 36 secured to intermediate shaft 16. The mounting means for brake shoes 35 comprises leaf springs 37 which are so tensioned as to exert upon brake shoes 35 the amount of force necessary to stop the rotation of intermediate shaft 16 when the engine is idling. In other words, leaf springs 37 cause brake shoes 35 to exert enough frictional resistance to overcome the drag torque transmitted through the converter.

Since the free ends of springs 37 are mounted upon intermediate shaft 16, which in turn is splined to the driven element 14 of the hydraulic torque converter, when the speed of rotation of the pump member 13 is sufficiently high to increase the torque imposed upon turbine element 14 substantially above that normally imposed at idling speed, brake shoes 35 will be forcibly slid along the surface of drum 34 and rotated. When the speed of rotation of brake shoes 35 reaches a predetermined amount, the centrifugal force generated in these shoes by the rotation thereof will be sufficient to move them radially off brake drum 34, thereby removing completely all resistance to the rotation of turbine element 14.

Thus whenever the engine speed is dropped down to idling speed, or whenever the engine is stopped completely, brake shoes 35 will engage brake drum 34 and arrest the rotation of intermediate shaft 16. Under such conditions jaw clutch 17 may be operated to make or break the connection between the hydraulic torque converter and the speed change gearing 19. After the desired operation of jaw clutch 17 has been effected the engine may be speeded up and the increased torque resulting from such faster rotation of the engine will overcome the braking force of brake shoes 35 and will ultimately cause these brake shoes to rotate at such a speed as to lift them completely from drum 34.

Although this invention has been described with reference to a hydraulic torque converter, it is understood that it is applicable to non-torque multiplying fluid couplings and in general to any device which possesses the characteristics of transmitting torque as a function of the speed of the driving element thereof. It is understood also that other forms of change speed gearing may be used and that the scope of the invention therefore is not to be limited to the form described above and illustrated in the accompanying drawing but is to be determined by the appended claims.

I claim:

1. A hydro-dynamic torque-transmitting device comprising a driving element, a driven element hydraulically associated with the driving element, and a brake for the driven element, said brake being normally biased to engaged position to arrest the rotation of the driven element and arranged to allow rotation of the driven element above a predetermined torque on the driven element impressed thereon by the driving element through its hydraulic association therewith.

2. A hydro-dynamic torque-transmitting device comprising a driving element, a driven element hydraulically associated with the driving element at all times, and a brake for the driven element, said brake being normally resiliently biased to engaged position to arrest the rotation of the driven element, and means operatively associated with the brake and driven by said driven element and controlled by centrifugal force set up in said means for disengaging the brake above a predetermined speed of the driven element.

3. A hydro-dynamic torque-transmitting device comprising a pump element, means for driving the pump element at different speeds, including an idling speed, a rotor driven hydraulically from the pump element and adapted to transmit an appreciable amount of torque at idling speed, and brake means associated with the driven element and constantly biased to engaged position to arrest the rotation of the driven element, said bias being sufficient to overcome the torque on the rotor at idling speed of the pump element and allowing rotation of the rotor at speeds of the pump element greater than idling speed, said brake means being arranged to disengage above a predetermined speed of the rotor.

4. A hydro-dynamic torque converter comprising a pump, a turbine and a stator, means for driving the pump at a plurality of speeds including an idling speed, a shaft connected to the turbine, a fixed frictional element, an element driven by the shaft, friction means adapted to cooperate with the fixed element, and a leaf spring connecting the friction means with the driven element, said spring being initially flexed to cause the friction means to engage the friction element at idling speed of the pump and arrest the rotation of the driven element.

5. A hydro-dynamic torque converter comprising a pump, a turbine and a stator, means for driving the pump at a plurality of speeds including an idling speed, a shaft connected to the turbine and driven thereby, a fixed drum, a flanged disc secured to the shaft, the flange of said disc being radially spaced from the drum, brake shoes intermediate the drum and flange and adapted to cooperate with the drum, and resilient means connecting the shoes for rotation with the flange, said means being initially compressed to bias the shoes to engaged position with a force which substantially equals the drag torque on the turbine when the pump is idling.

6. The combination described in claim 5, said resilient means comprising leaf springs.

7. A hydro-dynamic torque-transmitting device comprising a pump element; means for driving the pump element at different speeds, including an idling speed; a rotor driven hydraulically from the pump element and adapted to transmit an appreciable amount of torque at idling speed; and brake means associated with the driven element and constantly biased to engaged position to arrest the rotation of the driven element, said bias being sufficient to overcome the torque at speeds no greater than idling speed; said brake means comprising a fixed drum, radially operable brake shoes, and resilient means connecting the shoes to the rotor, said resilient means constantly biasing the shoes to engagement with the drum.

RICHARD L. SMIRL.